(12) United States Patent
Huang et al.

(10) Patent No.: US 12,475,938 B2
(45) Date of Patent: Nov. 18, 2025

(54) DELAY CONTROL CIRCUIT AND METHOD, AND SEMICONDUCTOR MEMORY

(71) Applicant: CHANGXIN MEMORY TECHNOLOGIES, INC., Hefei (CN)

(72) Inventors: Zequn Huang, Hefei (CN); Kai Sun, Hefei (CN)

(73) Assignee: CHANGXIN MEMORY TECHNOLOGIES, INC., Hefei (CN)

( * ) Notice: Subject to any disclaimer, the term of this patent is extended or adjusted under 35 U.S.C. 154(b) by 181 days.

(21) Appl. No.: 18/446,508

(22) Filed: Aug. 9, 2023

(65) Prior Publication Data
US 2024/0127881 A1     Apr. 18, 2024

Related U.S. Application Data

(63) Continuation of application No. PCT/CN2022/127123, filed on Oct. 24, 2022.

(30) Foreign Application Priority Data

Oct. 8, 2022     (CN) .......................... 202211223514.4

(51) Int. Cl.
G11C 11/40     (2006.01)
G06F 1/08      (2006.01)
(Continued)

(52) U.S. Cl.
CPC ............ *G11C 11/4076* (2013.01); *G06F 1/08* (2013.01); *G06F 11/106* (2013.01); *H03K 5/133* (2013.01);
(Continued)

(58) Field of Classification Search
CPC .......... G11C 11/4076; G11C 11/40626; G11C 11/4063; G06F 1/08; G06F 11/106;
(Continued)

(56) References Cited

U.S. PATENT DOCUMENTS 11,164,651 B2   11/2021 Song
2004/0184303 A1  9/2004 Manabe
(Continued)

FOREIGN PATENT DOCUMENTS

CN   105867510 A   8/2016
CN   109120258 A   1/2019
(Continued)

OTHER PUBLICATIONS

International Search Report in the international application No. PCT/CN2022/127123, mailed on Mar. 22, 2023. 3 pages.

*Primary Examiner* — Xiaochun L Chen
(74) *Attorney, Agent, or Firm* — Syncoda LLC; Feng Ma

(57) ABSTRACT

Provided in the embodiments of the present disclosure are a delay control circuit and method, and a semiconductor memory. The delay control circuit includes a clock circuit and a delay circuit. The clock circuit is configured to receive a temperature adjustment signal, and generate a first clock signal according to the temperature adjustment signal; and a clock cycle of the first clock signal is a preset value. The delay circuit is configured to receive the first clock signal and an initial command signal, and perform delay processing on the initial command signal according to the first clock signal, so as to obtain a target command signal; and a time interval between the target command signal and the initial command signal meets a preset timing condition.

15 Claims, 8 Drawing Sheets

(51) Int. Cl.
*G06F 11/10* (2006.01)
*G11C 11/4076* (2006.01)
*H03K 5/133* (2014.01)
*H03K 5/00* (2006.01)

(52) U.S. Cl.
CPC .............. *H03K 2005/00058* (2013.01); *H03K 2005/00241* (2013.01)

(58) Field of Classification Search
CPC ... G06F 1/10; G06F 1/14; G06F 1/206; G06F 1/3215; G06F 1/324; H03K 5/133; H03K 2005/00058; H03K 2005/00241
See application file for complete search history.

(56) References Cited

U.S. PATENT DOCUMENTS

2011/0128794 A1 6/2011 Yoon
2014/0013149 A1* 1/2014 Lee ..................... G11C 7/1072
                                                            713/401

FOREIGN PATENT DOCUMENTS

| CN | 112382321 A | 2/2021 |
| CN | 114242138 A | 3/2022 |
| JP | 2017168969 A | 9/2017 |

* cited by examiner ated error codewords, and write corrected data back to a storage array.

DELAY CONTROL CIRCUIT AND METHOD, AND SEMICONDUCTOR MEMORY

CROSS-REFERENCE TO RELATED APPLICATION

This is a continuation application of International Patent Application No. PCT/CN2022/127123, filed on Oct. 24, 2022, which is based upon and claims priority to Chinese Patent Application No. 202211223514.4, filed on Oct. 8, 2022 and entitled "DELAY CONTROL CIRCUIT AND METHOD, AND SEMICONDUCTOR MEMORY". The disclosures of International Patent Application No. PCT/CN2022/127123 and Chinese Patent Application No. 202211223514.4 are hereby incorporated by reference in their entireties.

BACKGROUND

With the continuous development of the semiconductor technology, when devices such as computers are manufactured and used by people, higher and higher requirements are proposed for the transmission speed of data. In order to obtain a faster data transmission speed, the devices such as a series of memories that can transmit data at Double Data Rate (DDR) are merged as the times require.

Taking a Dynamic Random Access Memory (DRAM) as an example, an Error Check and Scrub (ECS) mode allows the DRAM to internally read and modify detected error codewords, and write corrected data back to a storage array. During the process of executing an ECS operation, the DRAM needs different commands to implement different functions, such that there are timing requirements among different commands internally generated. However, the timing between different commands may not meet a timing condition due to the instability of a clock cycle in the prior art, affecting the performance of a memory.

SUMMARY

The present disclosure relates to the technical field of semiconductors, and in particular, to a delay control circuit and method, and a semiconductor memory. Embodiments of the present disclosure provide a delay control circuit and method, and a semiconductor memory.

According to aspect I: an embodiment of the present disclosure provides a delay control circuit, which includes a clock circuit and a delay circuit.

The clock circuit is configured to receive a temperature adjustment signal, and generate a first clock signal according to the temperature adjustment signal; and a clock cycle of the first clock signal is a preset value.

The delay circuit is configured to receive the first clock signal and an initial command signal, and perform delay processing on the initial command signal according to the first clock signal, so as to obtain a target command signal; and a time interval between the target command signal and the initial command signal meets a preset timing condition.

According to aspect II: an embodiment of the present disclosure provides a delay control method, which is applied to a delay control circuit. The method includes the following operations.

A temperature adjustment signal is received by a clock circuit, and a first clock signal is generated according to the temperature adjustment signal; and a clock cycle of the first clock signal is a preset value.

The first clock signal and an initial command signal are received by a delay circuit, and delay processing is performed on the initial command signal according to the first clock signal, so as to obtain a target command signal; and a time interval between the target command signal and the initial command signal meets a preset timing condition.

According to aspect III: an embodiment of the present disclosure provides a semiconductor memory. The semiconductor memory includes the delay control circuit that includes a clock circuit and a delay circuit.

The clock circuit is configured to receive a temperature adjustment signal, and generate a first clock signal according to the temperature adjustment signal, wherein a clock cycle of the first clock signal is a preset value.

The delay circuit is configured to receive the first clock signal and an initial command signal, and perform delay processing on the initial command signal according to the first clock signal, so as to obtain a target command signal, wherein a time interval between the target command signal and the initial command signal meets a preset timing condition.

DETAILED DESCRIPTION

The technical solutions in the embodiments of the present disclosure will be clearly and completely described below with reference to the accompanying drawings in the embodiments of the present disclosure. It is understandable that, the specific embodiments described here are merely used for explaining related disclosures rather than limiting the disclosure. In addition, it is to be further noted that, for ease of description, only the parts related to the disclosure are illustrated in the accompanying drawings.

Unless otherwise defined, all technical and scientific terms in the specification have the same meaning as those skilled in the art, belonging to the present disclosure, usually understand. Terms used in the specification are only used for describing the purpose of the present disclosure, but not intended to limit the present disclosure.

"Some embodiments" involved in the following descriptions describes a subset of all possible embodiments. However, it can be understood that "some embodiments" may be the same subset or different subsets of all the possible embodiments, and may be combined without conflicts.

It is to be noted that, term "first/second/third" involved in the embodiments of the disclosure is merely for distinguishing similar objects and does not represent a specific sequence of the objects. It can be understood that "first/second/third" may be interchanged to preset sequences or orders if allowed to implement the embodiments of the disclosure described herein in sequences except the illustrated or described ones.

Figure 1:
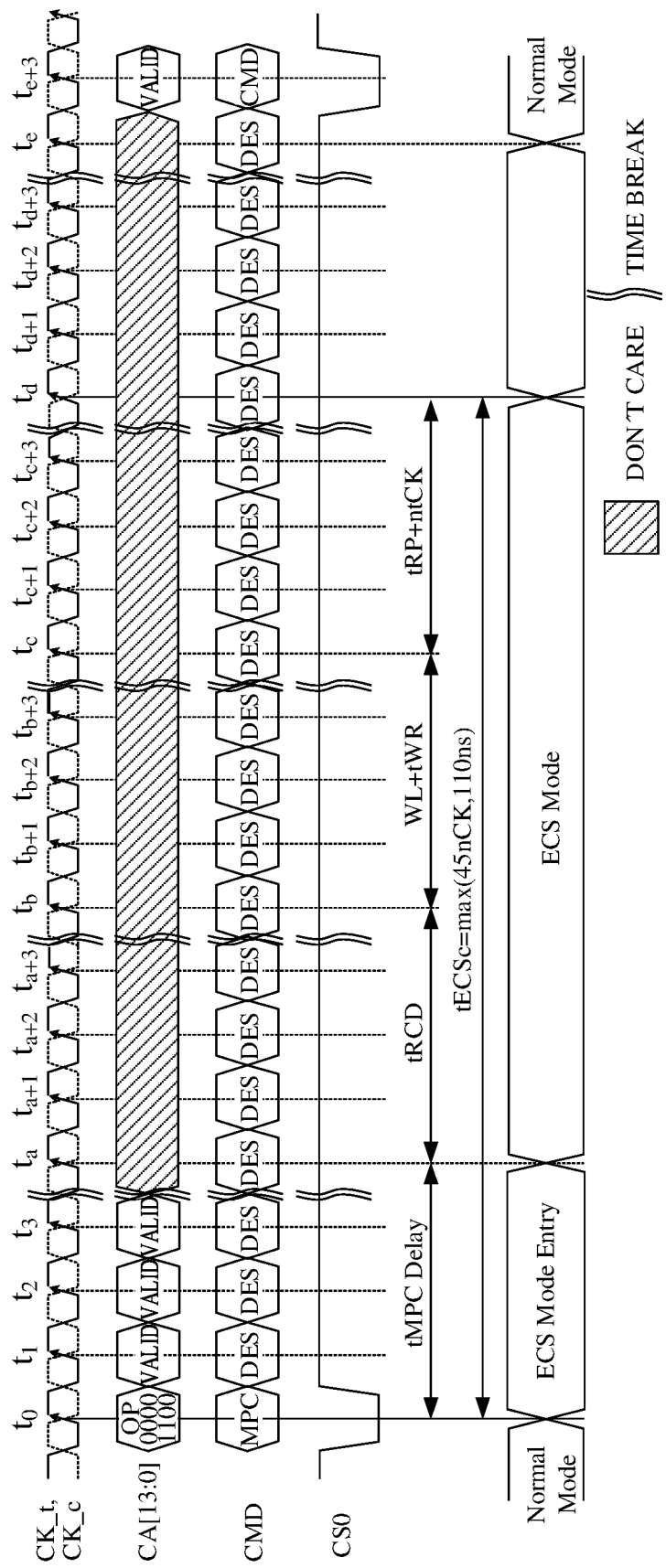
FIG. 1 is a schematic diagram of a timing relationship between command signals.

In a semiconductor memory such as a DRAM, there are usually timing requirements among command signals. Using execution of an ECS operation as an example, during the process of executing the ECS operation, the DRAM needs different commands to implement different functions, such that there are timing requirements among different commands internally generated. FIG. 1 is a schematic diagram of a timing relationship between partial command signals specified by the Joint Electron Device Engineering Council (JEDEC). As illustrated in FIG. 1, when an ECS operation is executed, the order of the self-generated command signals within the DRAM is an active signal (ACT), a read operation signal (RD), a write operation signal (WR), and a pre-charging signal (PRE); tRCD represents a time interval (or called "delay time") between the ACT and the RD; WL represents a time interval between the RD and the WR; and tWR represents a time interval between the WR and the PRE. Since all the command signals are internal self-generated commands, the DRAM needs to internally control the timing from the ACT to the RD and other command signals. For example, the tRCD needs to meet 15 nanoseconds (ns). However, since a register inside the DRAM does not record values such as the tRCD, timing control from the ACT to the RD and other command signals cannot be directly implemented through clock shifting.

Based on this, an embodiment of the present disclosure provides a delay control circuit, which includes a clock circuit and a delay circuit. The clock circuit is configured to receive a temperature adjustment signal, and generate a first clock signal according to the temperature adjustment signal; and a clock cycle of the first clock signal is a preset value. The delay circuit is configured to receive the first clock signal and an initial command signal, and perform delay processing on the initial command signal according to the first clock signal, so as to obtain a target command signal; and a time interval between the target command signal and the initial command signal meets a preset timing condition. In this way, the clock circuit generates the first clock signal based on the temperature adjustment signal, such that the clock cycle of the first clock signal is not affected by temperatures; then, delay processing is performed on the initial command signal according to the first clock signal, such that the time interval between the target command signal subjected to the delay and the initial command signal meets the preset timing condition. Therefore, the impact of the temperatures on the first clock signal is improved, such that delay time between the target command signal and the initial command signal meets a timing condition under the first clock signal; furthermore, the accuracy of the delay time is guaranteed, and the performance of the memory is improved.

Embodiments of the present disclosure are described in detail below with reference to the drawings.

Figure 2:
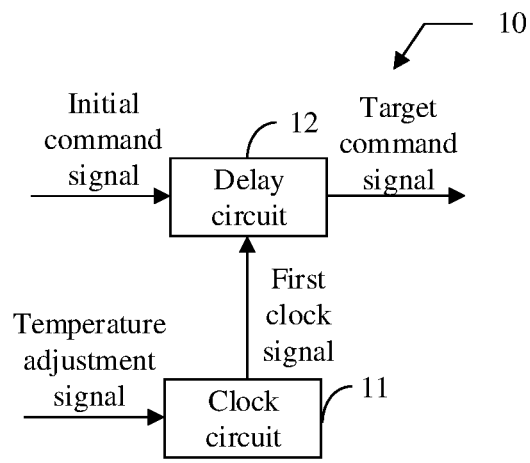
FIG. 2 is a schematic diagram of a composition structure of a delay control circuit according to an embodiment of the present disclosure.

In an embodiment of the present disclosure, FIG. 2 is a schematic diagram of a composition structure of a delay control circuit 10 according to an embodiment of the present disclosure. As illustrated in FIG. 2, the delay control circuit 10 may include a clock circuit 11 and a delay circuit 12.

The clock circuit 11 is configured to receive a temperature adjustment signal, and generate a first clock signal according to the temperature adjustment signal; and a clock cycle of the first clock signal is a preset value.

The delay circuit 12 is configured to receive the first clock signal and an initial command signal, and perform delay processing on the initial command signal according to the first clock signal, so as to obtain a target command signal; and a time interval between the target command signal and the initial command signal meets a preset timing condition.

It is to be noted that, this embodiment of the present disclosure may be applied to the timing control between command signals in a memory such as the DRAM. The delay circuit 12 is configured to perform delay processing on the initial command signal, so as to obtain the target command signal; and the time interval between the target command signal and the initial command signal meets the preset timing condition. The initial command signal is configured to execute a first operation, and the target command signal is configured to execute a second operation; and a specific operation is related to the type of the command signal. For example, this embodiment of the present disclosure may be applied to the timing control between the internal self-generated ACT and the RD, or the timing control between the RD and the WR, or the timing control between the WR and the PRE when the DRAM executes a manual or automatic ECS operation.

That is to say, in this embodiment of the present disclosure, the initial command signal may include an active signal, and the target command signal may include a read signal; or the initial command signal may include the read signal, and the target command signal may include a write signal; or the initial command signal may include the write signal, and the target command signal may include a pre-charging signal. The active signal is configured to execute an activation operation; the read signal is configured to is configured to execute a read operation; the write signal is configured to is configured to execute a write operation; and the pre-charging signal is configured to execute a pre-charging operation.

In addition, this embodiment of the present disclosure may not only be applied to the timing control between internal self-generated commands under the automatic ECS operation, but also be applied to the timing control between internal generated command signals in any memory, for example, a time interval between an active/Row Address Strobe (RAS) signal and a read/write/Column Address Strobe (CAS) signal. Implementation of this embodiment of the present disclosure is described in detail below by only using the timing control between the command signals during an ECS process.

Using the timing control between the ACT and the RD as an example, since both the ACT and the RD are internal self-generated commands in the DRAM, the DRAM needs to internally control the time interval between the ACT and the RD to meet the preset timing condition (tRCD), for example, the tRCD may be 15 ns.

When delay processing is performed on the initial command signal, the delay circuit 12 requires a clock signal as a clock to delay the initial command signal. For a manual ECS operation generated by a Multiple Purpose Command (MPC) and an automatic ECS operation generated by a refresh command, under these two ECS modes, there is an external clock signal, and a shifting register may use the external clock signal as a clock to perform delay processing on the initial command signal. Since a clock cycle corresponding to the external clock signal at different frequencies is different, the number of required registers is also different. However, a specific frequency of the external clock signal cannot be learned, in this case, the clock cycle of the external clock signal can only be known by using a mode register signal MRS OP<3:0> for decoding, so as to select the specific number of the shifting registers; in addition, the external clock signal (CK_t/CK_c) is required to be used as a clock signal of the shifting register. Therefore, the problem of the clock needs to be strictly considered when delay is performed on the initial command signal by using the shifting register. For an automatic ECS operation generated by a self-refresh command, since there is no external clock signal, the shifting register cannot implement a timing requirement for internal generation of the tRCD through delay. Based on this, in this embodiment of the present disclosure, the clock circuit 11 is used to generate the first clock signal as the clock signal of the shifting register, so as to provide the clock signal for the shifting register without the external clock signal, such that the shifting register can implement the delay of the signal.

In addition, for the manual ECS operation generated by the MPC command and the automatic ECS operation generated by the refresh command, the clock circuit 11 may also be added in a circuit, so as to use the first clock signal generated by the clock circuit 11 as the clock to delay the initial command signal. That is to say, a circuit that already has the external clock signal may still use the self-generated first clock signal of the delay control circuit provided in this embodiment of the present disclosure to achieve the timing control between the command signals.

It is further to be noted that, not only for the timing control between the command signals in the ECS operation but also for the timing control between any two command signals or other signals in a memory may be implemented by the delay control circuit provided in this embodiment of the present disclosure.

It is further to be noted that, the clock circuit 11 is a circuit that can internally self-generate the clock signal. However, in an actual application, changes in temperatures (including memory temperature changes caused by an external environment temperature, or temperature changes caused by internal operation of the memory) affects the performance of an internal circuit of the clock circuit 11, causing changes in the clock cycle of the clock signal generated by the clock circuit 11. If the delay circuit 12 performs delay processing on the initial command signal according to the changed clock signal, the time interval between the final target command signal and the initial command signal is led to not meet the preset timing condition.

For example, the preset timing condition requires the time interval between the initial command signal and the target command signal to be 15 ns. At a constant and stable temperature, the clock cycle of the clock signal generated by the clock circuit 11 is 0.625 ns, and the delay circuit 12 needs to delay the initial command signal by 24 clock cycles. If the temperature changes, the performance of the clock circuit 11 is affected by the temperature, and the clock cycle of the generated clock signal is changed to 0.63 ns. In this case, the delay circuit 12 still delays the initial command signal by 24 clock cycles, such that the time interval between the target command signal and the initial command signal is 24×0.63=15.12 ns, not meeting the preset timing condition of 15 ns.

Therefore, in this embodiment of the present disclosure, the clock circuit 11 is controlled and adjusted by the temperature adjustment signal, such that the clock circuit 11 is enabled to generate the first clock signal of which clock cycle is stabilized to the preset value. In this way, no matter how the temperature changes, based on adjustment of the temperature adjustment signal, the clock cycle of the first clock signal generated by the clock circuit 11 may always be temperature independent, such that the time interval between the target command signal and the initial command signal is guaranteed to meet the preset timing condition when the delay circuit 12 performs delay processing on the initial command signal according to the first clock signal.

Figure 3:
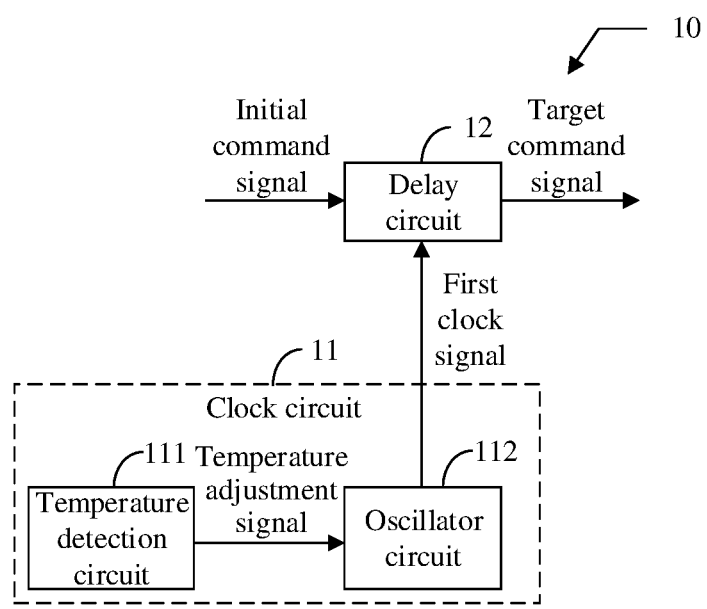
FIG. 3 is a schematic diagram of a composition structure of another delay control circuit according to an embodiment of the present disclosure.

Further, for the clock circuit 11, FIG. 3 is a schematic diagram of a composition structure of another delay control circuit 10 according to an embodiment of the present disclosure. As illustrated in FIG. 3, in some embodiments, the clock circuit 11 may include a temperature detection circuit 111 and an oscillator circuit 112.

The temperature detection circuit 111 is configured to monitor a temperature change of the clock circuit 11, and generate the temperature adjustment signal according to the temperature change.

The oscillator circuit 112 is configured to receive the temperature adjustment signal, and adjust an internal circuit structure according to the temperature adjustment signal, so as to generate the first clock signal.

It is to be noted that, as illustrated in FIG. 3, the clock circuit 11 may include the temperature detection circuit 111 for generating the temperature adjustment signal and the oscillator circuit 112 for generating the first clock signal. The temperature detection circuit 111 may monitor the temperature change of the clock circuit 11 in real time or at regular intervals, generate the temperature adjustment signal according to the temperature change, and send the temperature adjustment signal to the oscillator circuit 112. The temperature detection circuit 111 may be a temperature sensor. After receiving the temperature adjustment signal, the oscillator circuit 112 adjusts an internal circuit structure according to the temperature adjustment signal, such that a clock cycle of the first clock signal generated by the oscillator circuit 112 is stabilized to the preset value without changing with the temperature, thereby guaranteeing the reliability of the first clock signal as the clock.

Figure 4A:
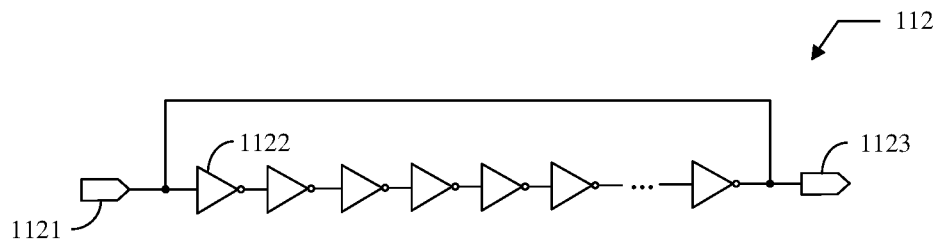
FIG. 4A is a schematic diagram of a specific structure of an oscillator circuit according to an embodiment of the present disclosure.

Further, for the oscillator circuit 112, FIG. 4A is a schematic diagram of a specific structure of an oscillator circuit 112 according to an embodiment of the present disclosure. As illustrated in FIG. 4A, the oscillator circuit 112 may include an input end 1121, a plurality of inverters 1122, and an output end 1123. If the number of the plurality of inverters 1122 is odd, and the plurality of inverters 1122 are connected in series, an output end of the last inverter 1122 is connected to an input end of the first inverter 1122. An input signal is sent to the oscillator circuit 112 at the input end 1121, so as to cause the oscillator circuit 112 to oscillate, such that a clock signal with a certain frequency is generated at the output end 1123. The frequency of the clock signal is related to a delay value of each inverter 1122, that is, the clock cycle of the clock signal is related to the delay value of each inverter 1122.

In a specific embodiment, the oscillator circuit 112 may be a Ring Oscillator (Ring OSC), or may be referred to as an oscillator.

Exemplarily, if a high-level signal (represented by 1) is inputted to the oscillator circuit 112 at the input end 1121, the last inverter 1122 outputs a low-level signal (represented by 0) at the output end 1123 after passing through the odd number of inverters 1122; and at the same time, 0 outputted by the last inverter 1122 is also transmitted to the first inverter 1122, and 1 is outputted after passing through the odd number of inverters 1122. In this way, the clock signal with a certain frequency can be obtained at the output end 1123.

Figure 4B:
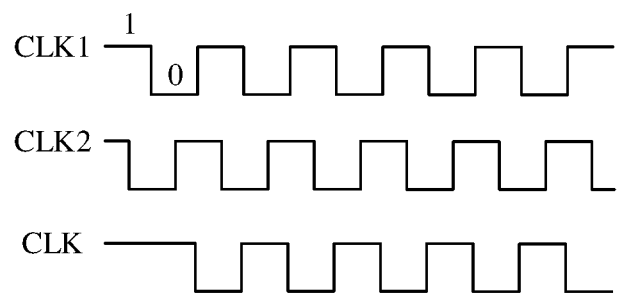
FIG. 4B is a schematic diagram of an oscillation waveform of an oscillator circuit according to an embodiment of the present disclosure.

For example, the oscillator circuit 112 includes 3 inverters. FIG. 4B is a schematic diagram of an oscillation waveform of the oscillator circuit. As illustrated in FIG. 4B, CLK1 represents a waveform diagram of a signal outputted by the first inverter; CLK2 represents a waveform diagram of a signal outputted by the second inverter; and CLK represents a waveform diagram of a signal outputted by the third inverter, that is, the first clock signal finally obtained. A low-level signal (i.e. Logic 0) is provided to the oscillator circuit 112 at the input end 1121, then a high-level signal (i.e. Logic 1) is obtained after passing through the first inverter, then Logic 0 is obtained by passing through the second inverter, then Logic 1 is obtained by passing through the third inverter, and Logic 1 is outputted as the first clock signal; meanwhile, Logic 1 returns and is inputted into the first inverter, Logic 0 is obtained after passing through the three inverters, and Logic 0 is outputted as the first clock signal, returns and inputted into the first inverter; and the delay effect of the inverters is taken into consideration, and the finally obtained first clock signal is illustrated in FIG. 4B.

Based on this, in some embodiments, the oscillator circuit 112 is configured to control, according to the temperature adjustment signal, the number of inverters required to generate clock signals internally, to adjust the internal circuit structure, so as to cause the clock cycle of the first clock signal to be the preset value.

It is to be noted that, when the temperature changes, the delay value of the inverter 1122 changes, causing the clock cycle of the generated clock signal to change. Therefore, in this embodiment of the present disclosure, the number of the inverters required to generate the clock signals inside the oscillator circuit 112 is adjusted according to the temperature adjustment signal, and the number of the inverters for generating the clock signals is increased and decreased according to the temperature adjustment signal, to improve the impact of the temperature on the clock cycle of the first clock signal, so as to obtain the first clock signal with a stable clock cycle.

Specifically, in some embodiments, the oscillator circuit is configured to, if the temperature adjustment signal indicates that the temperature change shows an increasing trend, decrease the number of inverters required to generate clock signals internally.

Alternatively, the oscillator circuit is configured to, if the temperature adjustment signal indicates that the temperature change shows a decreasing trend, increase the number of inverters required to generate clock signals internally.

It is to be noted that, at a high temperature, the delay of the single inverter is increased, and in this case, the number of the inverters incorporated into the Ring OSC may be decreased according to the temperature adjustment signal, so as to make the clock cycle of the first clock signal stable and constant. At a low temperature, the delay of the single inverters is decreased, and in this case, the number of the inverters incorporated into the Ring OSC may be increased according to the temperature adjustment signal, so as to make the clock cycle of the first clock signal stable and constant.

Figure 4C:
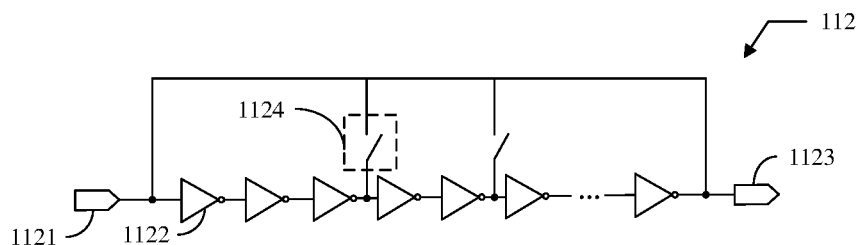
FIG. 4C is a schematic diagram of a specific structure of another oscillator circuit according to an embodiment of the present disclosure.

Based on FIG. 4A, referring to FIG. 4C, FIG. 4C is a schematic diagram of a specific structure of another oscillator circuit 112 according to an embodiment of the present disclosure. As illustrated in FIG. 4C, in some embodiments, the oscillator circuit 112 includes A inverters 1122 and B switch circuits 1124. The A inverters are connected in series, and an output end of the Ath inverter 1122 is connected to an input end of the first inverter 1122, and the bth switch circuit 1124 is connected between an output end of the ath inverter 1122 and an input end of the first inverter 1122, where A and B are both integers greater than 0, a is an integer greater than 0 and less than or equal to A, and b is an integer greater than 0 and less than or equal to B.

When the B switch circuits 1124 are all disconnected, the number of the inverters for generating the clock signals inside the oscillator circuit 112 is A.

When the bth switch circuit is switched on, and the rest of the switch circuits 1124 are all disconnected, the number of the inverters 1122 for generating the clock signals inside the oscillator circuit 112 is a.

It is to be noted that, since the periodically changing first clock signal is required to be generated, the number of the inverters included in the Ring OSC is usually odd (if the number is even, the output is always the same, such that clock signals with high levels and low levels cannot be obtained). Based on this, when the number of the inverters included in the Ring OSC is adjusted, it needs to be ensured that the adjusted number of the inverters for generating the clock signals is odd. Therefore, in this embodiment of the present disclosure, the number B of the switch circuits 1124 is usually less than the number A of the inverters 1122; and the bth switch circuit 1124 is connected between the output end of the ath inverter 1122 and the input end of the first inverter 1122, and a here usually refers to an odd number greater than 0 and less than A. In addition, based on actual implementation of the Ring OSC, it usually does not contain only one inverter. Therefore, more specifically, a here is usually not 1.

In an example illustrated in FIG. 4C, there is no switch circuit 1124 connected between the output end of the last inverter 1122 and the input end of the first inverter 1122. In other examples, the switch circuit 1124 may also be connected between the output end of the last inverter and the input end of the first inverter. As illustrated in FIG. 4C, when all the switch circuits 1124 are disconnected, the A inverters 1122 are all connected to a circuit, so as to generate the first clock signal. If the first switch circuit 1124 is switched on, the rest of the switch circuits 1124 are all disconnected, and the 1st to 3rd inverters 1122 are connected to the circuit, so as to generate the first clock signal; and if the second switch circuit 1124 is switched on, the rest of the switch circuits 1124 are all disconnected, the 1st to 5th inverters 1122 are connected to the circuit, so as to generate the first clock signal.

That is to say, in the oscillator circuit 112 illustrated in FIG. 4C, the switch circuit 1124 is positioned between the output end of an inverter 1122 and the input end of the first inverter 1122. This switch circuit is switched on according to the number of inverters 1122 required to generate the first clock signal, and the rest of the switch circuits 1124 are all maintained disconnected. If all inverters 1122 need to be connected to the circuit, all the switch circuits 1124 are disconnected. In addition, one switch circuit may also be added between the last inverter 1122 and the first inverter 1122. When all inverters 1122 are incorporated into the circuit, the switch circuit between the last inverter 1122 and the first inverter 1122 is switched on.

In this way, in this embodiment of the present disclosure, the switch on and off of the switch circuit may be controlled according to the temperature adjustment signal, so as to control the number of the inverters for generating the clock signals inside the oscillator circuit, such that, when the temperature changes, the oscillator circuit outputs the first clock signal with the stable clock cycle.

In addition, in this embodiment of the present disclosure, the number of the inverters connected to the circuit may be changed by means of adding a selector in the circuit. FIG. 4C is only an exemplary implementation, as long as the number of the inverters can be increased or decreased according to the temperature change, the demand to make the clock cycle of the first clock signal stable can be met.

In some embodiments, the temperature adjustment signal may be a temperature adjustment code, and there is a correspondence relationship between the value of the temperature adjustment code and the increasing or decreasing of the number of the inverters.

It is to be noted that, the temperature adjustment signal may specifically be the temperature adjustment code, and different values of the temperature adjustment code indicate that the increased or decreased number of the inverters is different. For example, if the value of the temperature adjustment code is 0, it indicates that the number of the inverters does not need to be changed; if the value of the temperature adjustment code is a positive value, it indicates that the number of the inverters needs to be decreased, and the larger the positive value, the greater the number needs to be decreased; and if the value of the temperature adjustment code is a negative value, it indicates that the number of the inverters needs to be increased, and the larger the absolute value of the negative value, the greater the number needs to be increased. Alternatively, that is to say, if the value of the temperature adjustment code is a positive value, it indicates that the number of the inverters needs to be increased; and if the value of the temperature adjustment code is a negative value, it indicates that the number of the inverters needs to be decreased, and specific limitations are not made thereto.

In addition, the temperature adjustment signal may also correspond to a temperature value of the clock circuit. Therefore, in some embodiments, there is a correspondence relationship between the value of the temperature adjustment signal and the number of the inverters required to generate clock signals inside the oscillator circuit. In this way, the value of the temperature adjustment signal corresponds to a specific temperature value, the number of the inverters corresponds to the temperature value, or the number of the inverters corresponds to a temperature range to which the temperature value belongs, such that the number of the inverters may be directly adjusted according to the value of the temperature adjustment signal.

In this way, in this embodiment of the present disclosure, the number of the inverters for generating the clock signals inside the oscillator circuit may be adjusted by means of different methods, such that, when the temperature changes, the clock cycle of the first clock signal is not affected by the temperature, and is stabilized to a preset value.

Figure 5A:
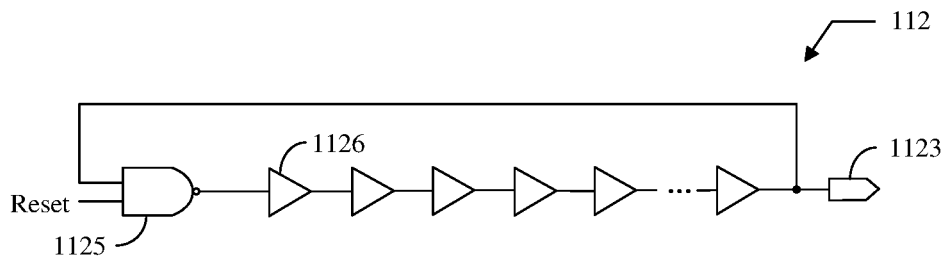
FIG. 5A is a schematic diagram of a specific structure of still another oscillator circuit according to an embodiment of the present disclosure.

Further, in some other embodiments, the oscillator circuit may also be implemented by a NAND gate and a buffer. FIG. 5A is a schematic diagram of a specific structure of still another oscillator circuit 112 according to an embodiment of the present disclosure. As illustrated in FIG. 5A, in some embodiments, the oscillator circuit 112 may include a NAND gate 1125 and a plurality of buffers 1126.

The oscillator circuit 112 is configured to control, according to the temperature adjustment signal, the number of buffers required to generate clock signals internally, to adjust the internal circuit structure, so as to cause a clock cycle of a first clock signal to be a preset value.

Figure 5B:
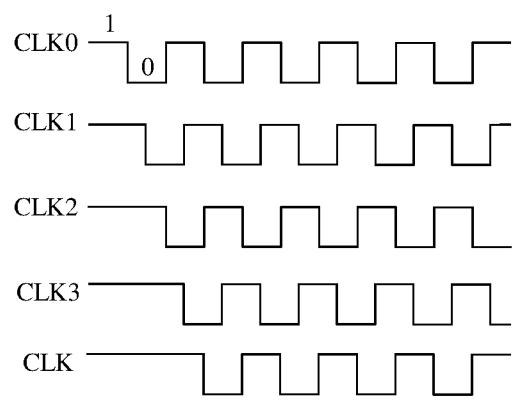
FIG. 5B is a schematic diagram of an oscillation waveform of another oscillator circuit according to an embodiment of the present disclosure.

It is to be noted that, as illustrated in FIG. 5A, the NAND gate 1125 and the plurality of buffers 1126 for the oscillator circuit (a Ring OSC); and output ends and input ends of the plurality of buffers 1126 are connected together, so as to form a ring shape. FIG. 5B is a schematic diagram of an oscillation waveform of the oscillator circuit. As illustrated in FIG. 5B, after acquiring a reset signal, the oscillator circuit starts to oscillate, and an oscillation frequency is related to a delay value of each buffer. When the impact of delay introduced by the reset signal is not taken into consideration, an oscillation waveform is illustrated in FIG. 5B. For example, there are four buffers; CLK0 represents a waveform of a signal outputted by the NAND gate 1125; CLK1 represents a waveform of a signal outputted by the first buffer 1126; CLK2 represents a waveform of a signal outputted by the second buffer 1126; CLK3 represents a waveform of a signal outputted by the third buffer 1126; and CLK represents a waveform of a signal (i.e., the first clock signal) outputted by the fourth buffer 1126. According to the waveform diagram, it may be seen that, a falling edge or a rising edge of the signal outputted by the previous buffer passes backwards in sequence, and restarts in reverse after reaching the last buffer, such that the periodic first clock signal is finally obtained.

In some embodiments, the oscillator circuit 112 is configured to, if the temperature adjustment signal indicates that the temperature change shows an increasing trend, decrease the number of the buffers required to generate clock signals internally.

Alternatively, the oscillator circuit 112 is configured to, if the temperature adjustment signal indicates that the temperature change shows a decreasing trend, increase the number of the buffers required to generate clock signals internally.

Figure 5C:
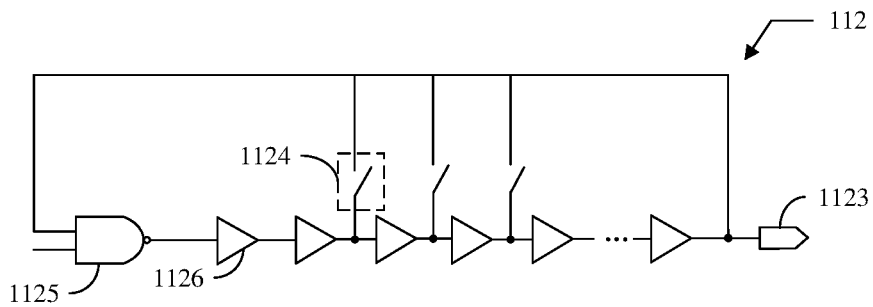
FIG. 5C is a schematic diagram of a specific structure of yet another oscillator circuit according to an embodiment of the present disclosure.

It is to be noted that, for the oscillator circuit 112 provided in FIG. 5A, the number of the buffers required to generate the clock signals internally may be changed by the temperature adjustment signal, so as to stabilize the clock cycle, and the clock cycle is related to the delay value of the buffer. The adjustment method is similar to the adjustment method of the oscillator circuit 112 provided in FIG. 4A, which is not described herein again, and is simply described with a schematic diagram of a specific structure illustrated in FIG. 5C. As illustrated in FIG. 5, the oscillator circuit 112 may further include a plurality of switch circuits 1124; and the switch circuits 1124 are connected between the output end of the buffer 1126 and an input end of the NAND gate 1125. By controlling the switch circuit between the certain buffer and the NAND gate, and disconnecting the rest of the switch circuits, the buffer and the buffer before the buffer are incorporated into the Ring OSC, so as to generate the first clock signal.

In combination with the above, in this embodiment of the present disclosure, the oscillator circuit may include a plurality of oscillator members (inverters or buffers) connected in series. The oscillator circuit is configured to control, according to the temperature adjustment signal, the number of oscillator members required to generate clock signals internally, to adjust the internal circuit structure, so as to cause a clock cycle of a first clock signal to be a preset value.

Specifically, the oscillator circuit 112 is configured to, if the temperature adjustment signal indicates that the temperature change shows an increasing trend, decrease the number of the oscillator members required to generate clock signals internally.

Alternatively, the oscillator circuit 112 is configured to, if the temperature adjustment signal indicates that the temperature change shows a decreasing trend, increase the number of the oscillator members required to generate clock signals internally.

In this way, in this embodiment of the present disclosure, the number of the oscillator members required to generate the clock signals inside the oscillator circuit is changed by the temperature adjustment signal, such that, when the temperature changes, the first clock signal with a stable clock cycle can still be generated.

Figure 6:
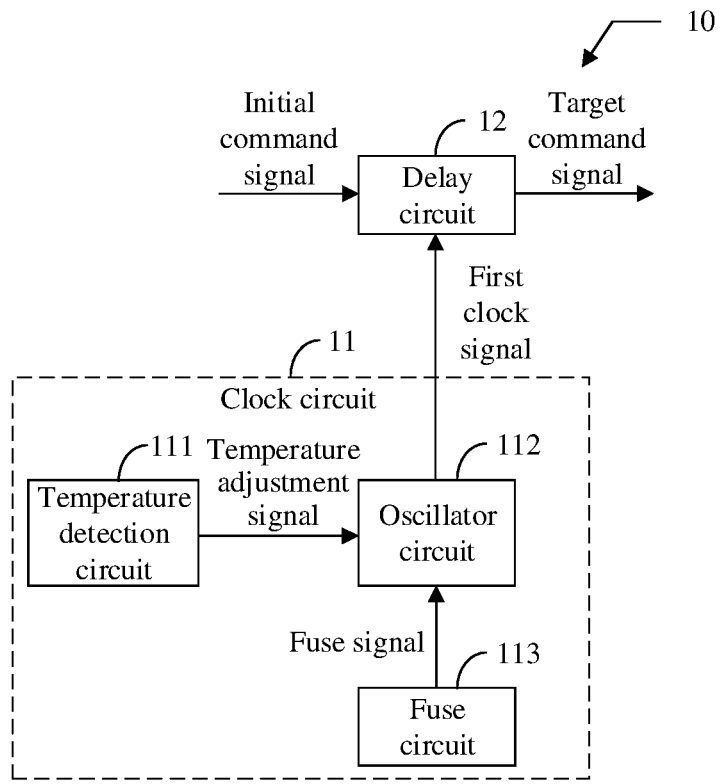
FIG. 6 is a schematic diagram of a composition structure of still another delay control circuit according to an embodiment of the present disclosure.

It is further to be noted that, in this embodiment of the present disclosure, the first clock signal generated by an oscillator is used as a clock signal of a shifting register. However, in addition to the temperature, during manufacturing and use of a device, the performance of the device is affected by factors such as process and voltages, that is, the oscillator is affected by Process Voltage Temperature (PVT). In addition to considering the effect of temperature, in the embodiment of the present disclosure, the impact of process and voltages is also taken into consideration. FIG. 6 is a schematic diagram of a composition structure of still another delay control circuit 10 according to an embodiment of the present disclosure. As illustrated in FIG. 6, in some embodiments, the clock circuit 11 may further include a fuse circuit 113.

The fuse circuit 113 is configured to provide a fuse signal to the oscillator circuit 112; and a target mode value indicated by the fuse signal is determined under a test mode.

The oscillator circuit 112 is further configured to generate the first clock signal according to the fuse signal and the temperature adjustment signal.

It is to be noted that, as illustrated in FIG. 6, the fuse circuit 113 is connected to the oscillator circuit 112, and is configured to provide a fuse signal to the oscillator circuit 112. The oscillator circuit 112 receives the fuse signal and the foregoing temperature adjustment signal, and generates the first clock signal according to the fuse signal and the temperature adjustment signal. The temperature adjustment signal can improve the impact of the temperature on the clock cycle; and the fuse signal can improve the impact of the process and voltages on the clock cycle.

It is further to be noted that, during the process that a memory is normally used, the value indicated by the fuse signal provided by the fuse circuit 113 is a target mode value that has been determined, which is a specific value determined under a test mode. That is to say, during the process that the memory is normally used, the oscillator circuit 112 receives the fuse signal with a constant value and the temperature adjustment signal varying with the temperature to generate the first clock signal, such that the clock cycle of the first clock signal is fixed as a preset value.

In this way, in this embodiment of the present disclosure, the impact of the temperature on the clock cycle may be improved by the temperature adjustment signal, and the impact of the process and voltages on the clock cycle may also be improved by the fuse signal, such that the clock signal of the first clock signal is stabilized as the preset value.

Figure 7:
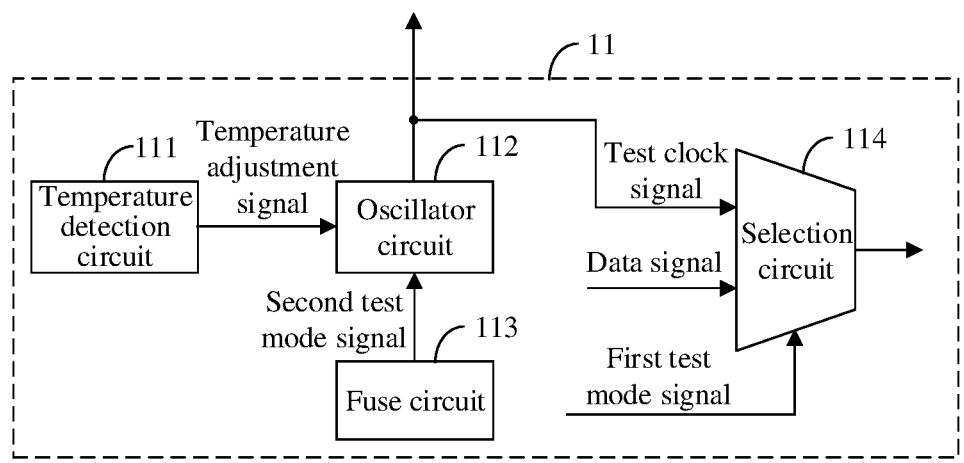
FIG. 7 is a schematic diagram of a composition structure of a clock circuit according to an embodiment of the present disclosure.

For a manner for determining the fuse signal, refer to FIG. 7. FIG. 7 is a schematic diagram of a composition structure of a clock circuit 11 according to an embodiment of the present disclosure. In some embodiments, as illustrated in FIG. 7, the clock circuit 11 may further include a selection circuit 114.

The fuse circuit 113 is further configured to set the value of a second test mode signal to a first candidate mode value under the test mode, and send the second test mode signal to the oscillator circuit 112.

The oscillator circuit 112 is further configured to generate a test clock signal according to the second test mode signal.

The selection circuit 114 is configured to receive a first test mode signal, and select the test clock signal for output according to the first test mode signal.

In some embodiments, the fuse circuit 113 is further configured to, if a clock cycle of the test clock signal is equal to the preset value, use the first candidate mode value as the target mode value, and burn the target mode value into a preset fuse, so as to cause the target mode value indicated by the fuse signal to be the same as the value of the second test mode signal.

It is to be noted that, as illustrated in FIG. 7, the clock circuit 11 may further include the selection circuit 114, which is configured to cooperate with the fuse circuit 113 and the oscillator circuit 112, so as to determine the target mode value indicated by the fuse signal. Under the test mode, the value of the fuse signal in the fuse circuit 113 is not determined. The values of different second test mode signals may be generated by using a testing machine to send an instruction, clock cycles of test clock signals outputted by the oscillator circuit 112 are compared at the values corresponding to respective second test mode signals. When the clock cycle of the test clock signal meets the required preset value, the value of the corresponding second test mode signal is the determined target mode value.

For the selection circuit 114, as illustrated in FIG. 7, in some embodiments, a first input end of the selection circuit 114 is connected to an output end of the oscillator circuit 112, so as to receive the test clock signal, a second input end of the selection circuit 114 is connected to a data signal, and a control end of the selection circuit 114 is connected to the first test mode signal.

The selection circuit 114 is configured to receive the first test mode signal, and select, according to the value of the first test mode signal, one of the test clock signal and the data signal for output.

If the value of the first test mode signal is a first value, the test clock signal is selected for output, and if the value of the first test mode signal is a second value, the data signal is selected for output.

It is to be noted that, the selection circuit 114 may be a selector with a binary choice (2-1 MUX), and includes a first input end, a second input end, a control end, and an output end. The first input end is configured to receive the test clock signal sent by the oscillator circuit 112; the second input end is configured to receive a data signal (for example, a read data signal); the control end is configured to receive a first test mode signal, and select the test clock signal or the data signal as an output signal of the selection circuit 114 according to the first test mode signal; and the output end of the selection circuit 114 is configured to output a selected signal. It is to be noted that, the selection circuit 114 is not limited to the 2-1 MUX, and no limitation is made herein.

It is further to be noted that, at the test mode, the clock cycle of the test clock signal needs to be detected, and then the test clock signal needs to be used as an output of the selection circuit 114, and in this case, the value of the first test mode signal (Test Mode 1 (TM1)) is a first value, such that the test mode signal is selected as the output of the selection circuit 114. When it is not at the test mode, the value of the first test mode signal is a second value, such that the data signal is selected as the output of the selection circuit 114, so as to achieve other function requirements of the circuit. The first value may be 1, and the second value may be 0.

In this way, the test clock signal is selectively outputted by the first test mode signal, so as to monitor the clock cycle of the test clock signal.

Specifically, under the test mode, the fuse circuit 113 first sets the value of the second test mode signal (TM2) to be a first candidate mode value, and then sends the second test mode signal to the oscillator circuit 112. Based on the second test mode signal, the oscillator circuit 112 adjusts the performance of devices included in the oscillator circuit, so as to change the clock cycle of the clock signal generated by the oscillator circuit 112; and under the test mode, the clock signal generated by the oscillator circuit 112 is denoted as the test clock signal. After generating the test clock signal, the oscillator circuit 112 sends the test clock signal to the selection circuit 114. The selection circuit 114 receives the first test mode signal, and selects the test clock signal for output according to the first test mode signal (when the first test mode signal is the first value). In this case, the clock cycle of the test clock signal outputted by the selection circuit 114 may be detected, and whether the detected clock cycle is equal to the preset value is determined; if so, the first candidate mode value is burned in a preset fuse as the target mode value, such that the value indicated by the fuse signal provided by the preset fuse is fixed as the target mode value indicated by the second test mode signal.

If the detected clock cycle is not equal to the preset value, it indicates that the first candidate mode value does not meet a requirement, then the next candidate mode value is continuously generated and sent to the oscillator circuit 112, and the clock cycle of the test clock signal is detected. Therefore, in some embodiments, the fuse circuit 113 is further configured to, if the clock cycle of the test clock signal is not equal to the preset value, set the value of the second test mode signal to be a second candidate mode value, continuously execute the operation of sending the second test mode signal to the oscillator circuit, until the clock cycle of the test clock signal is equal to the preset value, use the current candidate mode value of the second test mode signal as the target mode value, and burn the target mode value into the preset fuse, so as to cause the target mode value indicated by the fuse signal to be the same as the value of the second test mode signal.

It is to be noted that, if the clock cycle of the test clock signal is not equal to the preset value, the next candidate mode value needs to be used to continuously adjust the clock cycle of the test clock signal, such that the value of the second test mode signal is set to a second candidate mode value, and the second test mode signal is sent to the oscillator circuit 112. The oscillator circuit 112 performs adjustment based on the second test mode signal, so as to generate the test clock signal; and selection is performed by the selection circuit 114 for output, and the clock cycle of the test clock signal outputted by the selection circuit 114 is continuously detected. If the clock cycle is the same as the preset value, the second candidate mode value is used as the target mode value to be burned in the preset fuse; and if the clock cycle is different from the preset value, the next candidate mode value is continuously generated, until the clock cycle of the generated test clock signal is the same as the preset value, and then the corresponding candidate mode value is burned in the preset fuse.

That is to say, under a commonly used test mode, corresponding fuses are prepared for corresponding some test mode signals. Since the TM is completed by using the testing machine to send the instruction, the TM is not permanent. When the value of the TM2 is determined at a test phase, the value of the FUSE2 may be equal to the value of the TM2 by means of burning the value of the corresponding FUSE2 into the fuse, such that the value of the TM2 is replaced with the value of the FUSE2, so as to achieve the same effect, and the value is permanent.

It is further to be noted that, the target mode value determined under the test mode is configured to improve the impact of the process and voltages on the clock cycle of the clock signals generated by the oscillator circuit 112, such that the temperature when the test mode is executed may be set to a constant reference temperature. Based on this, when the temperature adjustment circuit determines whether the temperature shows an increasing trend or a decreasing trend, the detected temperature may be compared with the reference temperature, so as to determine a temperature changing trend.

In this way, the fuse circuit may provide the fuse signal to the oscillator circuit; the impact of the voltages and process on the clock cycle may be improved based on the fuse signal; and finally, under the combined action of the fuse signal and the temperature adjustment signal, the clock cycle of the first clock signal cannot be affected by PVT, so as to be stabilized as the preset value.

Figure 8:
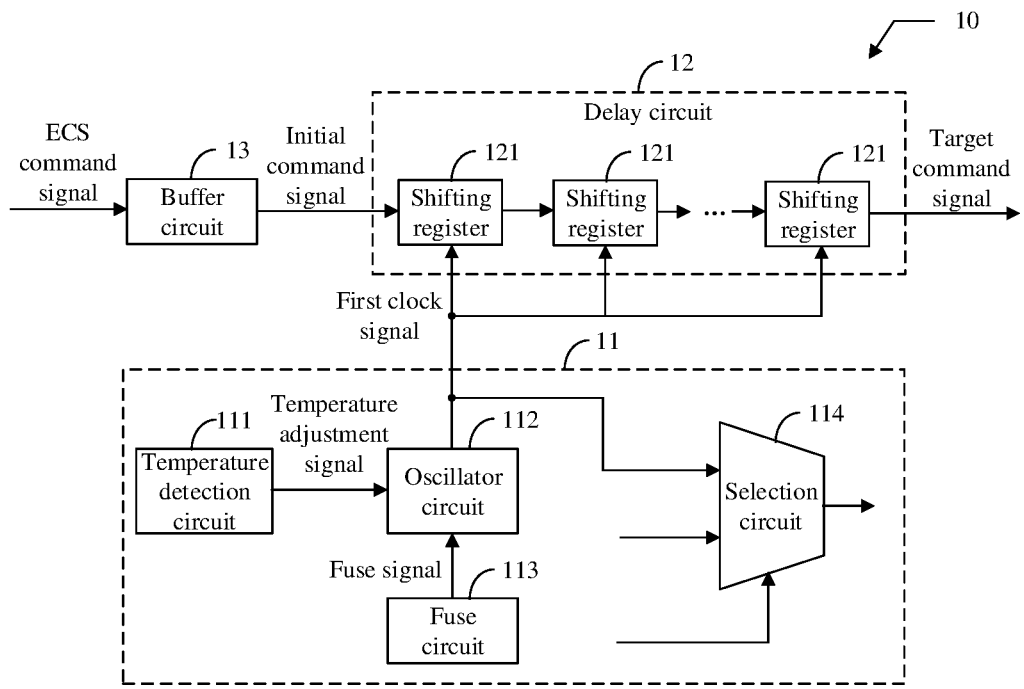
FIG. 8 is a schematic diagram of a composition structure of yet another delay control circuit according to an embodiment of the present disclosure.

Further, for the delay circuit 12, FIG. 8 is a schematic diagram of a composition structure of yet another delay control circuit 10 according to an embodiment of the present disclosure. As illustrated in FIG. 8, in some embodiments, the delay circuit 12 may include M shifting registers 121, where M is an integer greater than 0.

An input end of the first shifting register 121 is connected to the initial command signal, an input end of the yth shifting register 121 is connected to an output end of the (y−1)th shifting register 121, and an output end of the Mth shifting register 121 is configured to output the target command signal.

A clock end of each shifting register 121 is connected to the clock circuit 11, where y is an integer greater than 1 and less than or equal to M.

Figure 9:
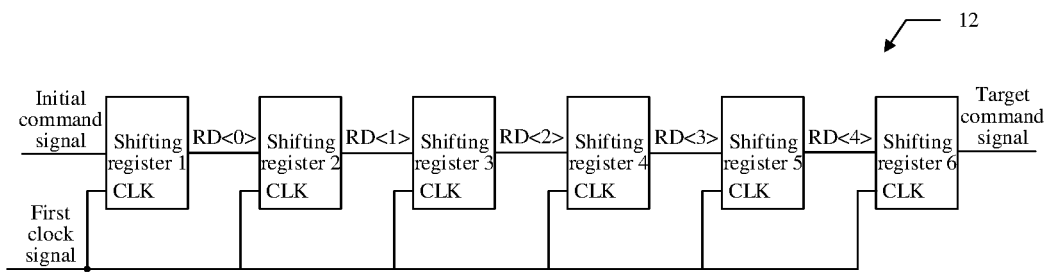
FIG. 9 is a schematic diagram of a composition structure of a delay circuit according to an embodiment of the present disclosure.

It is to be noted that, as illustrated in FIG. 8, the delay circuit 12 may consist of the M shifting registers 121 connected in series. Further, for example, M is equal to 6. FIG. 9 is a schematic diagram of a composition structure of a delay circuit 12 according to an embodiment of the present disclosure. As illustrated in FIG. 9, the 1st to 6th shifting registers are respectively denoted as the shifting register 1, the shifting register 2, the shifting register 3, the shifting register 4, the shifting register 5 and the shifting register 6. The clock end of each shifting register is represented with CLK, is connected to the clock circuit 11, and is specifically connected to the oscillator circuit 112 in the clock circuit 11, so as to receive the first clock signal as a clock for delay.

An input end of the shifting register 1 is configured to receive the initial command signal, perform delay processing on the initial command signal by using the first clock signal as the clock, so as to obtain an intermediate command signal RD<0>, and output the intermediate command signal by an output end of the shifting register 1. An input end of the shifting register 2 is configured to receive the intermediate command signal RD<0>, perform delay processing on the intermediate command signal RD<0> by using the first clock signal as the clock, so as to obtain an intermediate command signal RD<1>, and output the intermediate command signal by an output end of the shifting register 2. The subsequent shifting registers execute operation in the same way, until an input end of the shifting register 6 receives an intermediate command signal RD<4>, performs delay processing on the intermediate command signal RD<4>, so as to obtain a target command signal, and outputs the target command signal by an output end of the shifting register 6.

For each shifting register, in some embodiments, the shifting register is configured to delay a signal received by the input end by a first clock cycle for output; and the product of the first clock cycle and M is equal to the time interval.

It is to be noted that, in this embodiment of the present disclosure, the composition of each shifting register may be the same. The signal received by the input end of the shifting register can be delayed by the first clock cycle, and then outputted. Since there are M shifting registers, a time interval between the target command signal and the initial command signal is the product of the first clock cycle and M.

Exemplarily, assuming that the preset timing condition requires that the time interval between the target command signal and the initial command signal is 15 ns, each shifting register can delay the input signal by four clock cycles, and then output the signal, such that the six shifting registers can delay the initial command signal by 24 clock cycles, and each clock cycle may be 0.625 ns through calculation. In this case, the clock circuit 11 generates the first clock signal with the clock cycle being stabilized at 0.625 ns, so as to achieve the delay processing on the initial command signal based on this.

Figure 10:
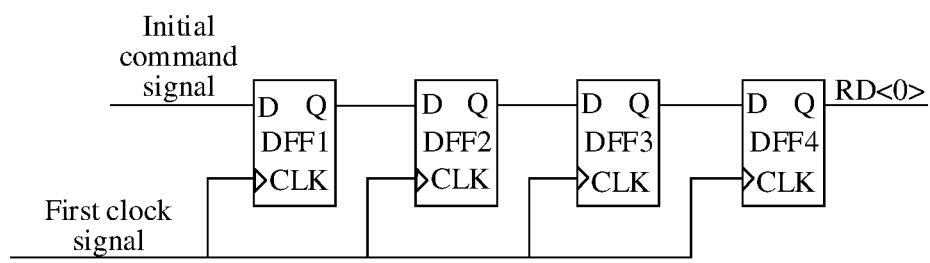
FIG. 10 is a schematic diagram of a composition structure of a shifting register according to an embodiment of the present disclosure.

Further, using the shifting register 1 as an example, FIG. 10 is a schematic diagram of a composition structure of a shifting register according to an embodiment of the present disclosure. As illustrated in FIG. 10, in some embodiments, the shifting register may include L flip-flops, and the L flip-flops are connected in series, where L is an integer greater than 0.

Clock ends of the L flip-flops are all connected to the clock circuit, so as to receive the first clock signal; and an output end of each flip-flop is connected to an input end of the next flip-flop.

It is to be noted that, in this embodiment of the present disclosure, the flip-flop may be a D Flip-Flop (DFF), and may be represented as DFF.

In some embodiments, the flip-flop is configured to delay a signal received by the input end by a second clock cycle for output; and the first clock cycle is equal to a product of the second clock cycle and L, and the second clock cycle is equal to the clock cycle of the first clock signal. That is to say, one flip-flop may delay the signal by the clock cycle of the first clock signal and then output the signal.

Exemplarily, for example, L is equal to 4, the shifting register may consist of four DFFs in series. An input end (D) of each DFF is configured to receive a signal inputted into the DFF; and a clock end (which is represented as CLK) of each DFF is configured to receive the first clock signal, delay the received signal by using the first clock signal, and then output the signal at an output end (Q).

Still using L being equal to 4 as an example, for the shifting register 1 in FIG. 9, as illustrated in FIG. 10, the shifting register 1 includes a first flip-flop DFF1, a second flip-flop DFF2, a third flip-flop DFF3, and a fourth flip-flop DFF4.

Clock ends of the first flip-flop DFF1, the second flip-flop DFF2, the third flip-flop DFF3, and the fourth flip-flop DFF4 are all connected to the clock circuit.

An input end of the first flip-flop DFF1 is connected to the initial command signal, and an output end of the first flip-flop DFF1 is connected to an input end of the second flip-flop DFF2.

An output end of the second flip-flop DFF2 is connected to an input end of the third flip-flop DFF3.

An output end of the third flip-flop DFF3 is connected to an input end of the fourth flip-flop DFF4.

An output end of the fourth flip-flop DFF4 is configured to output an output signal of the shifting register 1.

It is to be noted that, the structure of each shifting register may be the structure as illustrated in FIG. 10. Just for the shifting registers at different positions, the inputs and outputs are different. For the shifting register 1, the input is the initial command signal, and the output is the intermediate command signal RD<0>; for the shifting register 2, the input is the intermediate command signal RD<0>, and the output is the intermediate command signal RD<1>; and so on for other shifting registers, the target command signal is obtained by the output end of the last flip-flop of the last shifting register, such that the delay processing is performed on the initial command signal, so as to obtain the target command signal meeting a timing condition.

In this way, since the clock cycle of the first clock signal is constant, the number of the required shifting registers is fixed as $$\frac{tRCD}{t \times L}$$

for the time interval required by the preset timing condition, where tRCD represents the time interval; t represents the clock cycle of the first clock signal; L represents the number of the flip-flops in each shifting register; and t×L represents the time that each shifting register can delay the signal.

Figure 11:
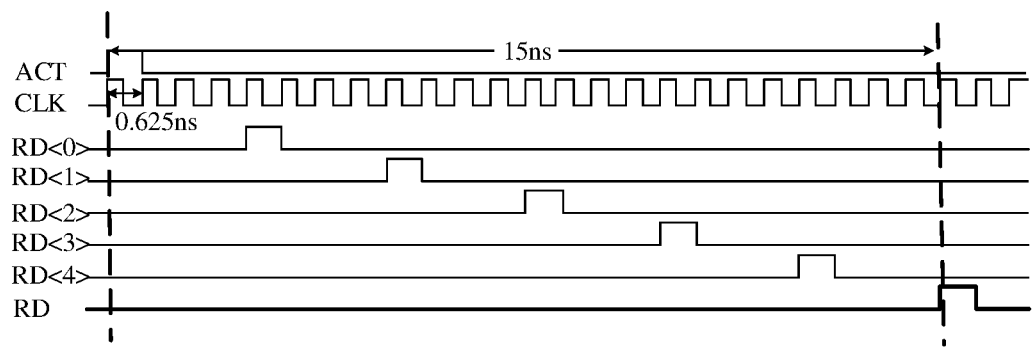
FIG. 11 is a schematic diagram of the timing of signals of the shifting registers according to an embodiment of the present disclosure.

For example, the delay circuit 12 is illustrated in FIG. 9, and corresponding signal timing is illustrated in FIG. 11. In FIG. 11, ACT (or represented as ECS ACT) is the initial command signal; CLK (or represented as ECS CLK) is the first clock signal; RD<0:4> is the intermediate command signal; and RD (or represented as ECS RD) is the target command signal. Specifically, as illustrated in FIG. 11, the output CLK of the oscillator circuit 112 is used as the clock signal of the delay circuit 12. The clock signal is not significantly affected by PVT, and the clock cycle of the clock signal is constant, such that the number of the shifting registers is also determined. In FIG. 11, for example, the clock signal of the CLK is 0.625 ns, and each shifting register is delayed by 4 clock cycles, such that 6 shifting registers are required to be connected in series for achieving delay of 15 ns. The output RD<0> of the 1st shifting register is delayed by 4 clock cycles relative to the ACT. Likewise, the output RD<1> of the 2nd shifting register is delayed by 8 clock cycles relative to the ACT; the output RD<2> of the 3rd shifting register is delayed by 12 clock cycles relative to the ACT; the output RD<3> of the 4th shifting register is delayed by 16 clock cycles relative to the ACT; the output RD<4> of the 5th shifting register is delayed by 20 clock cycles relative to the ACT; and the output RD of the 6th shifting register is delayed by 24 clock cycles relative to the ACT. That is to say, 24 clock cycles (15 ns in total) are delayed from the input ACT to the output RD.

Further, as illustrated in FIG. 8, in some embodiments, the delay control circuit 10 may further include a buffer circuit 13.

The buffer circuit 13 is configured to receive an ECS command signal, and generate the initial command signal according to the ECS command signal.

It is to be noted that, when a DRAM is in an ECS mode, and the initial command signal is an active signal, the initial command signal may be generated based on an ECS signal, such that the initial command signal may also be obtained according to an ECS command signal through the buffer circuit 13, and the foregoing processing is further performed on the initial command signal, so as to finally obtain the target command signal.

Herein, the buffer circuit may also be called a "transmission gate", which not only has a delay function, but also may have the effect of improving a signal driving capability. Specifically, for the ECS command signal and the initial command signal, the initial command signal not only has a delay compared with the ECS command signal, but also has stronger driving capability.

In brief, using an ECS operation as an example, for a manual ECS operation, an external clock signal may be used as a delay clock of the shifting register, to move the corresponding number of cycles, so as to achieve a delay requirement of the tRCD between the ACT and the RD. However, there is no external clock during Self Refresh, such that a register cannot delay to meet a time requirement for internally generating the tRCD. In order to solve the problem that there is no external clock during Self Refresh, in this embodiment of the present disclosure, the signal generated by the Ring OSC is used as the clock signal of the shifting register, but the clock cycle generated by an ordinary Ring OSC is strongly affected by the PVT.

In order to reduce the impact of the temperature on the clock cycle, in this embodiment of the present disclosure, control adjustment of the temperature is added in the Ring OSC, and a temperature sensor inside the DRAM may monitor changes in the temperature and output the temperature adjustment signal, such that the clock cycle generated by the Ring OSC at different temperatures may be adjusted, so as to maintain the clock cycle to be stable. For example, at a high temperature, the delay of a single-inverter becomes larger, such that the total clock cycle remains unchanged by using the temperature adjustment signal to reduce the inverters incorporated into the Ring OSC. There is the similar principle at a low temperature.

Under the test mode, the TM1 is used to select the test clock signal generated by the Ring OSC, and output the test clock signal to an output end of a selector, so as to monitor the clock cycle of the test clock signal, and then adjust the clock cycle of the test clock signal generated by the Ring OSC through the second test mode signal (TM2) and the fuse (FUSE2). During testing of a silicon wafer, the two test mode signals may be used to adjust and detect the clock cycle of the test clock signal, so as to stabilize the clock cycle at the preset value, thereby reducing the impact of the process and voltages. Then, after the TM2 is determined, the corresponding FUSE2 is used to burn the TM2 into the fuse for fixation.

The ECS command signal passes through the buffer circuit, so as to generate the initial command signal as an input signal of the shifting register, and the first clock signal generated by the Ring OSC is used as the clock of the shifting register, such that, even if there is no external clock during Self Refresh, the Ring OSC also generates the clock signal that does not vary with the PVT. Since the signal generated by the Ring OSC is constant and is not affected by an external frequency, the clock cycle of the first clock signal is determined, and the number of the shifting registers is also a determined value.

The embodiments of the present disclosure relate to circuits related to the timing between internally generated commands in the design of an integrated circuit, and in particular, to a DRAM chip in which the DRAM requires different command signals to achieve different functions, and timing requirements exist between different internally generated command signals, such that the circuits may be applied to a delay control circuit between the ACT and the RD under execution of an automatic ECS operation in the DRAM, but is not limited to this scope, and other circuits related to timing control between different internally generated command signals may all use the present solution.

The embodiments of the present disclosure provide the delay control circuit, which includes the clock circuit and the delay circuit. The clock circuit is configured to receive the temperature adjustment signal, and generate the first clock signal according to the temperature adjustment signal; and the clock cycle of the first clock signal is the preset value. The delay circuit is configured to receive the first clock signal and the initial command signal, and perform delay processing on the initial command signal according to the first clock signal, so as to obtain the target command signal; and the time interval between the target command signal and the initial command signal meets the preset timing condition. In this way, the clock circuit generates the first clock signal based on the temperature adjustment signal, such that the clock cycle of the first clock signal is not affected by temperatures, and adjustment is also performed by the fuse signal, to cause the clock cycle of the first clock signal to not affect by the process and voltages, so as to obtain the clock signal of which clock cycle is stabilized at the preset value; then, delay processing is performed on the initial command signal according to the first clock signal, such that the time interval between the target command signal subjected to the delay and the initial command signal meets the preset timing condition. Therefore, the delay time between the target command signal and the initial command signal meets a timing condition under the first clock signal, thereby guaranteeing the accuracy of the delay time, and thus improving the performance of a memory.

Figure 12:
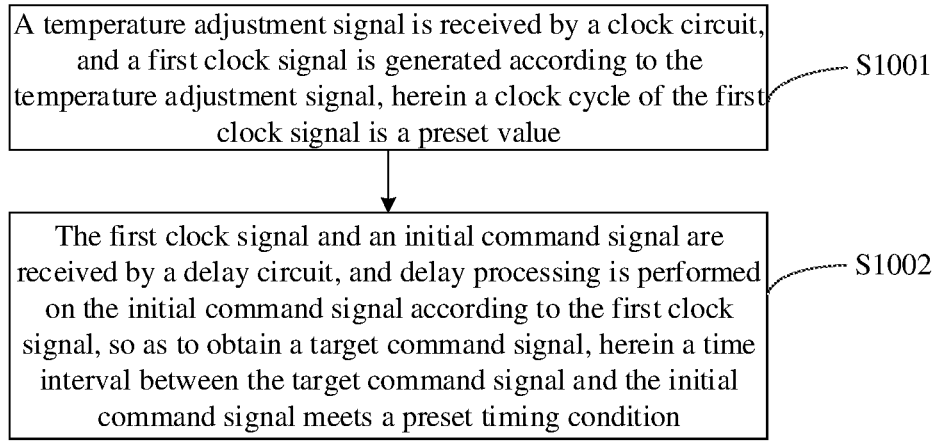
FIG. 12 is a schematic flowchart of a delay control method according to an embodiment of the present disclosure.

In another embodiment of the present disclosure, referring to FIG. 12, FIG. 12 is a schematic flowchart of a delay control method according to an embodiment of the present disclosure. As illustrated in FIG. 12, the method may include the following operations.

At S1001, a temperature adjustment signal is received by a clock circuit, and a first clock signal is generated according to the temperature adjustment signal; and a clock cycle of the first clock signal is a preset value.

At S1002, the first clock signal and an initial command signal are received by a delay circuit, and delay processing is performed on the initial command signal according to the first clock signal, so as to obtain a target command signal; and a time interval between the target command signal and the initial command signal meets a preset timing condition.

It is to be noted that, the method is applied to the delay control circuit provided in the foregoing embodiments.

In some embodiments, the operation of generating the first clock signal according to the temperature adjustment signal may include the following operations.

A temperature change of the clock circuit is monitored by the temperature detection circuit, and the temperature adjustment signal is generated according to the temperature change.

The temperature adjustment signal is received by the oscillator circuit, and an internal circuit structure is adjusted according to the temperature adjustment signal, so as to generate the first clock signal.

In some embodiments, the operation of adjusting the internal circuit structure according to the temperature adjustment signal may include the following operation.

The number of inverters required to generate clock signals internally is controlled according to the temperature adjustment signal, to adjust the internal circuit structure, so as to cause the clock cycle of the first clock signal to be the preset value.

In some embodiments, the operation of controlling, according to the temperature adjustment signal, the number of inverters required to generate clock signals internally may include the following operation.

If the temperature adjustment signal indicates that the temperature change shows an increasing trend, the number of inverters required to generate clock signals internally is decreased.

Alternatively, if the temperature adjustment signal indicates that the temperature change shows a decreasing trend, the number of inverters required to generate clock signals internally is increased.

In some embodiments, the method may further include the following operations.

A fuse signal is provided for the oscillator circuit by the fuse circuit; and a target mode value indicated by the fuse signal is determined under a test mode.

The fuse signal is received by the oscillator circuit, and the first clock signal is generated according to the fuse signal and the temperature adjustment signal.

In some embodiments, the method may further include the following operations.

The value of a second test mode signal is set to be a first candidate mode value by the fuse circuit under the test mode, and the second test mode signal is sent to the oscillator circuit.

The second test mode signal is received by the oscillator circuit, and a test clock signal is generated according to the second test mode signal.

A first test mode signal is received by the selection circuit, and the test clock signal is selected for output according to the first test mode signal.

If a clock cycle of the test clock signal is equal to the preset value, the first candidate mode value is used as the target mode value, and the target mode value is burned into a preset fuse, so as to cause the target mode value indicated by the fuse signal to be the same as the value of the second test mode signal.

In some embodiments, the method may further include the following operation.

If the clock cycle of the test clock signal is not equal to the preset value, the value of the second test mode signal is set to be a second candidate mode value by the fuse circuit, the operation of sending the second test mode signal to the oscillator circuit is continuously executed, until the clock cycle of the test clock signal is equal to the preset value, use the current candidate mode value of the second test mode signal as the target mode value, and the target mode value is burned into the preset fuse, so as to cause the target mode value indicated by the fuse signal to be the same as the value of the second test mode signal.

In some embodiments, the operation of receiving the first test mode signal by the selection circuit, and selecting the test clock signal for output according to the first test mode signal may include the following operation.

The first test mode signal is received by the selection circuit, and one of the test clock signal and the data signal is selected according to the value of the first test mode signal for output.

If the value of the first test mode signal is a first value, the test clock signal is selected for output, and if the value of the first test mode signal is a second value, the data signal is selected for output.

In some embodiments, the initial command signal includes an active signal, and the target command signal includes a read signal; or the initial command signal includes the read signal, and the target command signal includes a write signal; or the initial command signal includes the write signal, and the target command signal includes a pre-charging signal.

In some embodiments, the method may further include: receiving an ECS command signal by the buffer circuit, and performing delay and driving enhancement processing on the ECS command signal, so as to obtain the initial command signal.

The embodiment of the present disclosure provides a delay control method, which is applied to the delay control circuit provided in the foregoing embodiments. By means of the method, the first clock signal of which clock cycle is not affected by PVT can be obtained, such that the time interval between the target command signal and the initial command signal can meet the preset timing condition, thereby guaranteeing the accuracy of the delay time, and thus improving the performance of a memory.

Figure 13:
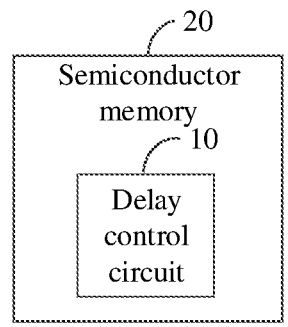
FIG. 13 is a schematic diagram of a composition structure of a semiconductor memory according to an embodiment of the present disclosure.

In still another embodiment of the present disclosure, FIG. 13 is a schematic diagram of a composition structure of a semiconductor memory 20 according to an embodiment of the present disclosure. As illustrated in FIG. 13, the semiconductor memory 20 at least includes the delay control circuit 10 described in any one of the foregoing embodiments.

In some embodiments, the semiconductor memory 20 includes a DRAM.

In the embodiments of the present disclosure, the DRAM may not only conform to internal storage specifications such as DDR, DDR2, DDR3, DDR4, and DDR5, but also conform to internal storage specifications such as LPDDR, LPDDR2, LPDDR3, LPDDR4, and LPDDR5, and no limitations are constituted herein.

In the embodiments of the present disclosure, since the semiconductor memory 20 includes the delay control circuit described in the foregoing embodiments, the accuracy of the delay time between the internal command signals can be improved, so as to achieve timing control between the command signals.

The above descriptions are merely preferred embodiments of the disclosure, and are not intended to limit the protection scope of the present disclosure.

It is to be noted that terms "include" and "comprise" or any other variant thereof is intended to cover nonexclusive inclusions herein, such that a process, method, object or apparatus including a series of components not only includes those components but also includes other components which are not clearly listed or further includes components intrinsic to the process, the method, the object or the apparatus. Under the condition of no more limitations, a component defined by the statement "including a/an" does not exclude existence of the same other components in a process, method, object or apparatus including the component.

The serial numbers of the foregoing embodiments of the present disclosure are merely for description, and do not represent the superiority or inferiority of the embodiments.

The methods disclosed in several method embodiments provided by the present disclosure can be combined arbitrarily without conflict to obtain a new method embodiment.

The characteristics disclosed in several product embodiments provided in the present disclosure can be combined arbitrarily without conflict to obtain a new product embodiment.

The characteristics disclosed in several method or circuit embodiments provided in the present disclosure can be combined arbitrarily without conflict to obtain a new method embodiment or circuit embodiment.

The above is only the specific implementations of the present disclosure and not intended to limit the scope of protection of the present disclosure. Any variations or replacements apparent to those skilled in the art within the technical scope disclosed by the present disclosure shall fall within the scope of protection of the present disclosure. Therefore, the protection scope of the present disclosure shall be subject to the protection scope of the claims.

INDUSTRIAL APPLICABILITY

The embodiments of the present disclosure provide the delay control circuit and method, and the semiconductor memory. The delay control circuit includes the clock circuit and the delay circuit. The clock circuit is configured to receive the temperature adjustment signal, and generate the first clock signal according to the temperature adjustment signal; and the clock cycle of the first clock signal is the preset value. The delay circuit is configured to receive the first clock signal and the initial command signal, and perform delay processing on the initial command signal according to the first clock signal, so as to obtain the target command signal; and the time interval between the target command signal and the initial command signal meets the preset timing condition. In this way, the clock circuit generates the first clock signal based on the temperature adjustment signal, such that the clock cycle of the first clock signal is not affected by temperatures; then, delay processing is performed on the initial command signal according to the first clock signal, such that the time interval between the target command signal being subjected to the delay and the initial command signal meets the preset timing condition. Therefore, the impact of the temperatures on the first clock signal is improved, such that delay time between the target command signal and the initial command signal meets a timing condition under the first clock signal; furthermore, the accuracy of the delay time is guaranteed, and the performance of the memory is improved.

The invention claimed is:

1. A delay control circuit, comprising
a clock circuit and a delay circuit, wherein
the clock circuit is configured to receive a temperature adjustment signal, and generate a first clock signal according to the temperature adjustment signal, wherein a clock cycle of the first clock signal is a preset value; and
the delay circuit is configured to receive the first clock signal and an initial command signal, and perform delay processing on the initial command signal according to the first clock signal, so as to obtain a target command signal, wherein a time interval between the target command signal and the initial command signal meets a preset timing condition; the clock circuit comprises an oscillator circuit and a fuse circuit, the fuse circuit is configured to provide a fuse signal for the oscillator circuit, wherein a target mode value indicated by the fuse signal is determined under a test mode; and
the oscillator circuit is further configured to generate the first clock signal according to the fuse signal and the temperature adjustment signal; the clock circuit further comprises a selection circuit;
the fuse circuit is further configured to set a value of a second test mode signal to be a first candidate mode value under the test mode, and send the second test mode signal to the oscillator circuit;
the oscillator circuit is further configured to generate a test clock signal according to the second test mode signal; and
the selection circuit is configured to receive a first test mode signal, and select the test clock signal for output according to the first test mode signal.

2. The delay control circuit of claim 1, wherein the clock circuit comprises a temperature detection circuit;
the temperature detection circuit is configured to monitor a temperature change of the clock circuit, and generate the temperature adjustment signal according to the temperature change; and
the oscillator circuit is configured to receive the temperature adjustment signal, and adjust an internal circuit structure according to the temperature adjustment signal, so as to generate the first clock signal.

3. The delay control circuit of claim 1, wherein
the oscillator circuit comprises a plurality of inverters; and
the oscillator circuit is configured to control, according to the temperature adjustment signal, a number of inverters required to generate clock signals internally, to adjust the internal circuit structure, so as to cause the clock cycle of the first clock signal to be the preset value.

4. The delay control circuit of claim 3, wherein
the oscillator circuit is configured to, when the temperature adjustment signal indicates that the temperature change shows an increasing trend, decrease the number of inverters required to generate clock signals internally;

or
the oscillator circuit is configured to, when the temperature adjustment signal indicates that the temperature change shows a decreasing trend, increase the number of inverters required to generate clock signals internally.

5. The delay control circuit of claim 1, wherein
the fuse circuit is further configured to, when a clock cycle of the test clock signal is equal to the preset value, use the first candidate mode value as the target mode value, and burn the target mode value into a preset fuse, so as to cause the target mode value indicated by the fuse signal to be same as the value of the second test mode signal.

6. The delay control circuit of claim 5, wherein
the fuse circuit is further configured to, when the clock cycle of the test clock signal is not equal to the preset value, set the value of the second test mode signal to be a second candidate mode value, continuously execute the operation of sending the second test mode signal to the oscillator circuit, until the clock cycle of the test clock signal is equal to the preset value, use a current candidate mode value of the second test mode signal as the target mode value, and burn the target mode value into the preset fuse, so as to cause the target mode value indicated by the fuse signal to be the same as the value of the second test mode signal.

7. The delay control circuit of claim 1, wherein
a first input end of the selection circuit is connected to an output end of the oscillator circuit, so as to receive the test clock signal, a second input end of the selection circuit is connected to a data signal, and a control end of the selection circuit is connected to the first test mode signal; and
the selection circuit is configured to receive the first test mode signal, and select one of the test clock signal and the data signal for output according to the value of the first test mode signal;
wherein when the value of the first test mode signal is a first value, the test clock signal is selected for output, and when the value of the first test mode signal is a second value, the data signal is selected for output.

8. The delay control circuit of claim 1, wherein
the delay circuit comprises M shifting registers, and M is an integer greater than 0;
an input end of a first shifting register is connected to the initial command signal, an input end of a yth shifting register is connected to an output end of a (y−1)th shifting register, and an output end of an Mth shifting register is configured to output the target command signal; and
a clock end of each shifting register is connected to the clock circuit, wherein y is an integer greater than 1 and less than or equal to M.

9. The delay control circuit of claim 8, wherein
each shifting register is configured to delay a signal received by the input end by a first clock cycle for output, and a product of the first clock cycle and M is equal to the time interval.

10. The delay control circuit of claim 8, wherein
each shifting register comprises L flip-flops, and the L flip-flops are connected in series, wherein L is an integer greater than 0;
clock ends of the L flip-flops are all connected to the clock circuit, so as to receive the first clock signal; and an output end of each flip-flop is connected to an input end of a next flip-flop.

11. The delay control circuit of claim 1, wherein
the initial command signal comprises an active signal, and the target command signal comprises a read signal; or
the initial command signal comprises the read signal, and the target command signal comprises a write signal; or
the initial command signal comprises the write signal, and the target command signal comprises a pre-charging signal.

12. The delay control circuit of claim 1, further comprising
a buffer circuit, wherein the buffer circuit is configured to receive an Error Check and Scrub (ECS) command signal, and generate the initial command signal according to the ECS command signal.

13. A delay control method, applied to a delay control circuit, comprising:
receiving a temperature adjustment signal by a clock circuit, and generating a first clock signal according to the temperature adjustment signal, wherein a clock cycle of the first clock signal is a preset value; and
receiving the first clock signal and an initial command signal by a delay circuit, and performing delay processing on the initial command signal according to the first clock signal, so as to obtain a target command signal, wherein a time interval between the target command signal and the initial command signal meets a preset timing condition; providing a fuse signal for the oscillator circuit by the fuse circuit, wherein a target mode value indicated by the fuse signal is determined under a test mode; and
generating the first clock signal according to the fuse signal and the temperature adjustment signal by the oscillator circuit;
setting a value of a second test mode signal to be a first candidate mode value under the test mode by the fuse circuit, and sending the second test mode signal to the oscillator circuit;
generating a test clock signal according to the second test mode signal by the oscillator circuit; and
receiving a first test mode signal, and selecting the test clock signal for output according to the first test mode signal by the selection circuit.

14. A semiconductor memory, comprising
a delay control circuit, wherein the delay control circuit comprises a clock circuit and a delay circuit, wherein
the clock circuit is configured to receive a temperature adjustment signal, and generate a first clock signal according to the temperature adjustment signal, wherein a clock cycle of the first clock signal is a preset value; and
the delay circuit is configured to receive the first clock signal and an initial command signal, and perform delay processing on the initial command signal according to the first clock signal, so as to obtain a target command signal, wherein a time interval between the target command signal and the initial command signal meets a preset timing condition; the clock circuit comprises an oscillator circuit and a fuse circuit, the fuse circuit is configured to provide a fuse signal for the oscillator circuit, wherein a target mode value indicated by the fuse signal is determined under a test mode; and
the oscillator circuit is further configured to generate the first clock signal according to the fuse signal and the temperature adjustment signal; the clock circuit further comprises a selection circuit;
the fuse circuit is further configured to set a value of a second test mode signal to be a first candidate mode value under the test mode, and send the second test mode signal to the oscillator circuit;

the oscillator circuit is further configured to generate a test clock signal according to the second test mode signal; and the selection circuit is configured to receive a first test mode signal, and select the test clock signal for output according to the first test mode signal.

15. The semiconductor memory of claim 14, comprising a Dynamic Random Access Memory (DRAM).

* * * * *